United States Patent [19]

Valet et al.

[11] Patent Number: 5,817,821
[45] Date of Patent: Oct. 6, 1998

[54] MIXTURES OF POLYALKYLPIPERIDIN-4-YL DICARBOXYLIC ACID ESTERS AS STABILIZERS FOR ORGANIC MATERIALS

[75] Inventors: Andreas Valet, Binzen, Germany; Rita Pitteloud, Praroman, Switzerland

[73] Assignee: Ciba Specialty Chemicals Corporation, Tarrytown, N.Y.

[21] Appl. No.: 862,033

[22] Filed: May 22, 1997

[30] Foreign Application Priority Data

May 28, 1996 [EP] European Pat. Off. .............. 96810342

[51] Int. Cl.⁶ .................................................. C07D 211/36
[52] U.S. Cl. ............................................ 546/188; 524/102
[58] Field of Search ............................. 524/102; 546/188

[56] References Cited

U.S. PATENT DOCUMENTS

| | | | |
|---|---|---|---|
| 3,640,928 | 2/1972 | Murayama et al. | 524/99 |
| 4,075,165 | 2/1978 | Soma et al. | 524/99 |
| 4,419,472 | 12/1983 | Berner et al. | 524/102 |
| 4,461,898 | 7/1984 | Meier et al. | 546/188 |
| 5,028,645 | 7/1991 | Gugumus et al. | 524/102 |
| 5,439,959 | 8/1995 | Raspanti | 524/100 |

FOREIGN PATENT DOCUMENTS

| | | |
|---|---|---|
| 146878 | 7/1985 | European Pat. Off. . |
| 624624 | 11/1994 | European Pat. Off. . |
| 2202853 | 10/1988 | United Kingdom . |

*Primary Examiner*—John Kight
*Assistant Examiner*—Garth M. Dahlen
*Attorney, Agent, or Firm*—Luther A. R. Hall

[57] ABSTRACT

A mixture containing two different compounds of the formula (I)

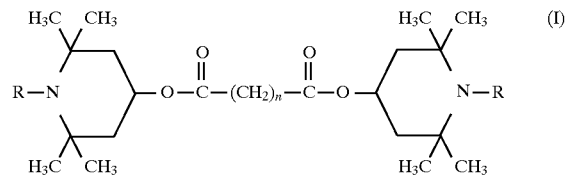

wherein n is an integer from 2 to 22 and R is hydrogen, $C_1$–$C_8$alkyl, —O·, —OH, —NO, —$CH_2$CN, $C_1$–$C_{18}$alkoxy, $C_5$–$C_{12}$cycloalkoxy, $C_3$–$C_6$alkenyl, $C_3$–$C_6$alkynyl, $C_1$–$C_8$acyl or $C_7$–$C_9$phenylalkyl unsubstituted or substituted on the phenyl by 1, 2 or 3 $C_1$–$C_4$alkyl; the weight ratio of the two compounds being 1:20 to 20:1, is useful as stabilizer for organic materials against degradation induced by light, heat or oxidation.

17 Claims, No Drawings

MIXTURES OF POLYALKYLPIPERIDIN-4-YL DICARBOXYLIC ACID ESTERS AS STABILIZERS FOR ORGANIC MATERIALS

The present invention relates to a mixture containing two different polyalkylpiperidin-4-yl dicarboxylic acid esters, to the organic material stabilized with the aid of this mixture against degradation induced by light, heat or oxidation and to the corresponding use of the mixture for stabilizing an organic material.

The use of several polyalkylpiperidin-4-yl dicarboxylic acid esters—as single compounds or in mixtures—for stabilizing organic materials is, for example, described in U.S. Pat. Nos. 5,028,645, 4,461,898 and 4,419,472, EP-A-146 878 and GB-A-2 202 853.

The present invention relates to a stabilizer mixture containing two different compounds of the formula (I)

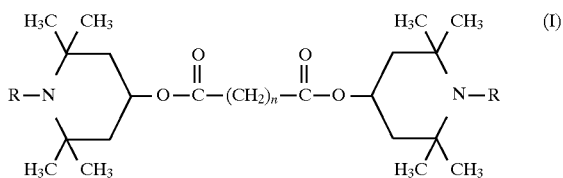

wherein n is an integer from 2 to 22 and R is hydrogen, $C_1$–$C_8$alkyl, —O·, —OH, —NO, —$CH_2CN$, $C_1$–$C_{18}$alkoxy, $C_5$–$C_{12}$cycloalkoxy, $C_3$–$C_6$alkenyl, $C_3$–$C_6$alkynyl, $C_1$–$C_8$acyl or $C_7$–$C_9$phenylalkyl unsubstituted or substituted on the phenyl by 1, 2 or 3 $C_1$–$C_4$alkyl; the weight ratio of the two compounds being 1:20 to 20:1.

Examples of $C_1$–$C_8$alkyl are methyl, ethyl, propyl, isopropyl, butyl, 2-butyl, isobutyl, t-butyl, pentyl, 2-pentyl, hexyl, heptyl, octyl, 2-ethylhexyl and t-octyl.

Examples of $C_1$–$C_{18}$alkoxy are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. $C_1$–$C_8$Alkoxy, in particular heptoxy and octoxy, is preferred.

Examples of $C_5$–$C_{12}$cycloalkoxyane cyclopentoxy, cyclohexoxy, cycloheptoxy, cyclooctoxy, cyclodecyloxy and cyclododecyloxy. $C_5$–$C_8$Cycloalkoxy, in particular cyclopentoxy and cyclohexoxy, is preferred.

Examples of $C_3$–$C_6$alkenyl are allyl, 2-methylallyl, butenyl and hexenyl. The carbon atom attached to the nitrogen is preferably saturated.

An example of $C_3$–$C_6$alkynyl is 2-propynyl.

Examples of $C_1$–$C_8$acyl are formyl, acetyl, propionyl, butyryl, pentanoyl, hexanoyl, heptanoyl, octanoyl and benzoyl. $C_1$–$C_8$Alkanoyl and benzoyl are preferred. Acetyl is especially preferred.

Examples of $C_7$–$C_9$phenylalkyl which is unsubstituted or substituted on the phenyl by 1, 2 or 3 $C_1$–$C_4$alkyl are benzyl, methylbenzyl, dimethylbenzyl, trimethylbenzyl, t-butylbenzyl and 2-phenylethyl. Benzyl is preferred.

The variable n is preferably an integer from 2 to 10, in particular an integer from 2 to 8, for example 2 to 4 or 4 to 8.

The weight ratio of the two different compounds of the formula (I) being present in the stabilizer mixture is preferably 1:15 to 15:1, for example 1:10 to 10:1, 1:8 to 8:1, 1:6 to 6:1, 1:5 to 5:1, 1:4 to 4:1 or 1:3 to 3:1.

When the stabilizer mixture contains additionally a third compound of the formula (I), the weight ratio of said compound to the total amount of the other two compounds of the formula (I) may be 1:20 to 20:1, preferably 1:15 to 15:1, for example 1:10 to 10:1, 1:8 to 8:1, 1:6 to 6:1, 1:5 to 5:1, 1:4 to 4:1 or 1:3 to 3:1.

A preferred embodiment of the instant invention relates to a stabilizer mixture wherein the two compounds of the formula (I) differ only in the variable n.

A further preferred embodiment of the instant invention relates to a mixture wherein the two compounds of the formula (I) differ in the variable n and the difference between the two values of n is 1, 2, 3, 4 or 5.

Of particular interest are the following stabilizer mixtures:

A mixture wherein the variable n of one compound of the formula (I) is 3 and the variable n of the other compound of the formula (I) is 4 or 8.

A mixture wherein the variable n of one compound of the formula (I) is 4 and the variable n of the other compound of the formula (I) is 7 or 8.

A mixture wherein the variable n of one compound of the formula (I) is 7 and the variable n of the other compound of the formula (I) is 8.

Preference is also given to a stabilizer mixture wherein the variable n of one compound of the formula (I) is 2 and the variable n of the other compound of the formula (I) is 3; said mixture containing additionally a third compound of the formula (I) with n being 4.

Of interest is further a stabilizer mixture wherein the two compounds of the formula (I) differ only in the meaning of the radical R.

R is preferably hydrogen, $C_1$–$C_4$alkyl, —OH, $C_1$–$C_8$alkoxy, $C_5$–$C_8$cycloalkoxy, allyl, benzyl, acetyl or acryloyl, in particular hydrogen or methyl.

The stabilizer mixtures of the compounds of the formula (I) may be prepared analogously to known esterification or transesterification methods by reacting, for example, a piperidinol of the formula (II)

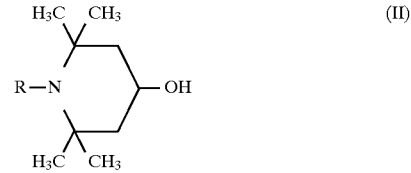

with a mixture of organic dicarboxylic acid esters of the formula (III)

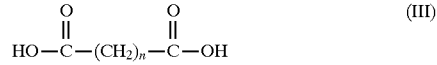

or derivatives thereof. Suitable dicarboxylic acid derivatives are for example chlorides or lower alkyl esters such as a methyl ester or an ethyl ester. When in the reaction acid chlorides are used as derivatives of the dicarboxylic acid esters, it is convenient to add an acid acceptor, for example an amine such as pyridine or triethylamine in a quantity of at least two equivalents with regard to the acid chlorides.

When the reaction is carried out as a transesterification of a piperidinol of the formula (II) with a mixture of esters of dicarboxylic acids of the formula (III), usual transesterification catalysts are added to the reaction mixture, for example an organic base or an inorganic base such as $LiNH_2$, LiOMe, KOH, Li tert-butylate, a tert-amylate (e.g. Na tert-amylate) and the like or Lewis acids such as dibutyltin oxide, Al tris[isopropylate], Al tris[sec-butylate], Ti tetra[isopropylate] or Ti tetra[sec-propylate].

The necessary dicarboxylic acid mixtures can be obtained by mixing of the commercially available dicarboxylic acids.

Of particular practical interest is the use of commercially available dicarboxylic acid mixtures such as "Dicarbons äuregemisch destilliert" (=Dicarboxylic acid mixture distilled) ex ®BASF or dicarboxylic acid ester mixtures, for example ®DBE, ®DBE2 and ®DBE3 ex ®Du Pont.

It is also possible to prepare first the single compounds of the formula (I) which are subsequently mixed in the desired weight ratio.

The stabilizer mixtures according to the instant invention are very effective in improving the light, heat and oxidation resistance of organic materials. This materials can be, for example, oils, fats, waxes, cosmetics or biocides. Of particular interest is their use in polymeric materials such as plastics, rubbers and paints.

Specific examples of organic materials which can be stabilized are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (Du Pont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or poly tetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenolF, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

The invention thus also relates to a composition comprising an organic material subject to oxidative, thermal or light-induced degradation and a stabilizer mixture according to the instant invention.

The organic material to be stabilized is preferably a synthetic polymer, more particularly one selected from the aforementioned groups. Polyolefins are preferred and polyethylene and polypropylene are particularly preferred.

A preferred organic material is also a thermoplastic polymer or a binder for coatings.

The amount of the stabilizer mixture to be used depends on the organic material to be stabilized and on the intended use of the stabilized material. In general, it is appropriate to use, for example, 0.01 to 10% by weight of the total amount of the stabilizer mixture, relative to the weight of the material to be stabilized, preferably 0.01 to 5%, in particular 0.05 to 1%.

The stabilizer mixture can be added, for example, to the polymeric materials before, during or after the polymerization or crosslinking of the said materials. Furthermore, the stabilizer mixture can be incorporated in the polymeric materials in the pure form or encapsulated in waxes, oils or polymers.

In general, the stabilizer mixture according to the invention can be incorporated in the organic materials to be stabilized by various processes, such as dry mixing in the form of powder, or wet mixing in the form of solutions or suspensions or also in the form of a masterbatch; in such operations, the polymer can be used in the form of powder, granules, solutions, suspensions or in the form of latices.

Also, the single components of the stabilizer mixture according to the instant invention can be added to the material to be stabilized.

The materials stabilized with the stabilizer mixture according to the instant invention can be used for the production of mouldings, films, tapes, monofilaments, fibres, surface coatings and the like.

If desired, other conventional additives for synthetic polymers, such as antioxidants, UV absorbers, nickel stabilizers, pigments, fillers, plasticizers, corrosion inhibitors and metal deactivators, can be added to the organic materials containing the stabilizer mixture according to the instant invention.

Particular examples of said conventional additives are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-di-methylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol, and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3.5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxyl-3-methylphenyl)propionic acid with mono- or polyhydric alcohols, e.g. with methanol, ethanol, n-octanol , i-octanol , octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3.5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9- nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3.5-di-tert-butyl-4-hydroxyphenyl) propionic acid e.g. N,N'-bis(3,5-di-tert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, Bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexydiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol300;, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4 -methylphenyl undecylketoxime, nickel complexes of 1-phenyl-4-lauroyl-5-hydroxypyrazole, with or without additional ligands.

2.6. Sterically hindered amines, for example bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2, 6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dion, bis(1-octyloxy-2,2,6,6-tetramethylpiperidyl)sebacate, bis(1-octyloxy-2,2,6,6-tetramethylpiperidyl)succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane und epichlorohydrin.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and paramethoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propyloxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methylphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methylphosphite, bis(2,4-di-tert-butyl-6-methylphenyl) ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkyl-hydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863, 4,338,244, 5,175,312, 5,216,052, 5,252,643, DE-A-4316611, DE-A-4316622, DE-A-4316876, EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The weight ratio of the stabilizer mixture according to the instant invention to the conventional additives may be for example 1:0.5 to 1:5.

Of particular interest is the use of the stabilizer mixture according to the invention as stabilizer for coatings, for example for paints. The invention therefore also relates to compositions wherein the material to be stabilized is a film-forming binder for coatings.

The novel coating composition preferably comprises 0.01–10 parts by weight of the stabilizer mixture according to the invention, in particular 0.05–10 parts by weight, especially 0.1–5 parts by weight, per 100 parts by weight of the binder (in solid form).

Multilayer systems are also possible here, where the concentration of the stabilizer mixture according to the invention in the outer layer can be higher, for example from 1 to 15 parts by weight, especially 3 to 10 parts by weight, per 100 parts by weight of the binder (in solid form).

The use of the stabilizer mixture according to the invention as stabilizer in coatings has the additional advantage that delamination, i.e. peeling-off of the coating from the substrate, is prevented. This advantage is particularly important in the case of metallic substrates, including in the case of multilayer systems on metallic substrates.

The binder (material to be stabilized) can in principle be any binder which is customary in industry, for example those as described in Ullmann's Encyclopedia of Industrial Chemistry, 5th Edn., Vol. A18, pp. 368–426, VCH, Weinheim, 1991. In general, this is a film-forming binder based on a thermoplastic or thermosetting resin, predominantly based on a thermosetting resin. Examples thereof are alkyd, acrylic, polyester, phenolic, melamine, epoxy and polyurethane resins and mixtures thereof.

The material to be stabilized can be a cold-curable or hot-curable binder; it may be advantageous to add a curing catalyst. Suitable catalysts which accelerate curing of the binder are described, for example, in Ullmann's Encyclopedia of Industrial Chemistry, Vol. A18, p. 469, VCH Verlagsgesellschaft, Weinheim, 1991.

Preference is given to coating compositions in which the material to be stabilized is a binder comprising a functional acrylate resin and a crosslinking agent.

Examples of coating compositions containing specific binders are:

1. Paints based on cold- or hot-crosslinkable alkyd, acrylate, polyester, epoxy or melamine resins, or mixtures of such resins, if desired with addition of a curing catalyst;

2. Two-component polyurethane paints based on hydroxyl-containing acrylate, polyester or polyether resins and aliphatic or aromatic isocyanates, isocyanurates or polyisocyanates;

3. One-component polyurethane paints based on blocked isocyanates, isocyanurates or polyisocyanates which are deblocked during baking;

4. Two-component paints based on (poly)ketimines and aliphatic or aromatic isocyanates, isocyanurates or polyisocyanates;

5. Two-component paints based on (poly)ketimines and an unsaturated acrylate resin or a polyacetoacetate resin or a methacrylamidoglycolate methyl ester;

6. Two-component paints based on carboxyl- or amino-containing polyacrylates and polyepoxides;

7. Two-component paints based on anhydride-containing acrylate resins and a polyhydroxyl or polyamino component;

8. Two-component paints based on acrylate-containing anhydrides and polyepoxides;

9. Two-component paints based on (poly)oxazolines and anhydride-containing acrylate resins or unsaturated acrylate resins or aliphatic or aromatic isocyanates, isocyanurates or polyisocyanates;

10. Two-component paints based on unsaturated polyacrylates and polymalonates;

11. Thermoplastic polyacrylate paints based on thermoplastic acrylate resins or externally crosslinking acrylate resins in combination with etherified melamine resins;

12. Paint systems based on siloxane-modified or fluorine-modified acrylate resins.

In addition to the material to be stabilized and the stabilizer mixture according to the invention, the novel coating composition may comprise, as additional component, a further light-stabilizer of the sterically hindered amine type and/or a 2-hydroxyphenyl-2H-benzotriazole and/or a 2-(2-hydroxyphenyl)-1,3,5-triazine, for example as mentioned in the above list under points 2.1, 2.6 and 2.8.

The efficiency of the stabilizer mixture according to the invention can be particularly improved, when as additional component an UV absorber based on hydroxyphenylbenzotriazoles and/or hydroxybenzophenones and/or oxalic anilides and/or hydroxyphenyl-s-triazines, for example as mentioned in the above list under points 2.1, 2.2, 2.7 and 2.8 is present.

The additional component is preferably used in an amount of 0.05 to 5 parts by weight, per 100 parts by weight of the binder (in solid form).

In addition to the material to be stabilized and the stabilizer mixture according to the invention, the coating composition can comprise further components, for example solvents, pigments, dyes, plasticizers, stabilizers, thixotropic agents, drying catalysts and/or flow-control agents. Examples of possible components are those as described in Ullmann's Encyclopedia of Industrial Chemistry, 5th Edn., Vol. A18, pp. 429–471, VCH, Weinheim, 1991.

Possible drying catalysts or curing catalysts are, for example, organometallic compounds, amines, amino-containing resins and/or phosphines. Examples of organometallic compounds are metal carboxylates, in particular those of the metals Pb, Mn, Co, Zn, Zr and Cu, or metal chelates, in particular those of the metals Al, Ti and Zr, or organometallic compounds, for example organotin compounds.

Examples of metal carboxylates are the stearates of Pb, Mn and Zn, the octanoates of Co, Zn and Cu, the naphthenates of Mn and Co and the corresponding linoleates, resinates and tallates.

Examples of metal chelates are the aluminium, titanium and zirconium chelates of acetylacetone, ethyl acetylacetate, salicyl aldehyde, salicyl aldoxime, o-hydroxyacetophenone and ethyl trifluoroacetylacetate, and the alkoxides of these metals.

Examples of organotin compounds are dibutyltin oxide, dibutyltin dilaurate and dibutyltin dioctanoate.

Examples of amines are in particular tertiary amines, for example tributylamine, triethanolamine, N-methyldiethanolamine, N-dimethylethanolamine, N-ethylmorpholine, N-methylmorpholine and diazabicyclooctane (triethylenediamine) and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst can also be a phosphine, for example triphenylphosphine.

The novel coating compositions can also be radiation-curable. In this case, the binder essentially comprises monomeric or oligomeric compounds containing ethylenically unsaturated bonds which are cured, after application, by actinic radiation, i.e. are converted into a crosslinked, high-molecular-weight form. UV-curing systems generally additionally contain a photoinitiator. Corresponding systems are described in the abovementioned publication, Ullmann's Encyclopedia of Industrial Chemistry, 5th Edn. Vol. A18, pages 451–453. In radiation-curable coating compositions, the novel stabilizer mixtures can also be employed without addition of sterically hindered amines.

The novel coating compositions can be applied to any desired substrates, for example to metal, wood, plastic or ceramic materials. They are preferably used as top coat in the painting of automobiles. If the top coat comprises two layers, of which the lower layer is pigmented and the upper layer is not pigmented, the novel coating composition can be used for either the upper or the lower layer or for both layers, but preferably for the upper layer.

The novel coating compositions can be applied to the substrates by conventional processes, for example by brushing, spraying, pouring, dipping or electrophoresis; see also Ullmann's Encyclopedia of Industrial Chemistry, 5th Edn., Vol. A18, pp. 491–500.

The curing of the coatings can—depending on the binder system—be carried out at room temperature or by warming. The coatings are preferably cured at 50°–150° C., powder coatings also at higher temperatures.

The coatings obtained in accordance with the invention have excellent resistance to the harmful effects of light, oxygen and heat; particular mention should be made of the good light and weathering resistance of the coatings, for example paints, obtained in this way.

The invention therefore also relates to a coating, in particular a paint, which has been stabilized against the harmful effects of light, oxygen and heat by a content of the stabilizer mixture according to the invention. The paint is preferably a top coat for automobiles.

The coating compositions can comprise an organic solvent or solvent mixture in which the binder is soluble. However, the coating composition can also be an aqueous solution or dispersion. The vehicle can also be a mixture of an organic solvent and water. The coating composition can also be a high-solids paint or contain no solvent (powder paint).

The pigments can be inorganic, organic or metallic pigments. The novel coating compositions preferably contain no pigments and are used as clear coats.

Likewise preferred is the use of the coating composition as top coat for applications in the automobile industry, in particular as a pigmented or unpigmented top coat of the finish. However, use for underlying layers is also possible.

The compounds of the formula (I) can also be used as stabilizers, especially as light stabilizers, for almost all materials known in the art of photographic reproduction and other reproduction techniques as e. g. described in Research Disclosure 1990, 31429 (pages 474 to 480).

The examples below describe the invention in greater detail. In the examples, parts and percentages are by weight; room temperature is taken to mean a temperature in the range from 20° to 25° C. These definitions apply unless stated otherwise in each case.

Examples of stabilizer mixtures according to the invention are shown in Table 1 below.

TABLE 1

$$R-N\underset{H_3C\;\;\;CH_3}{\overset{H_3C\;\;\;CH_3}{\diagup\!\!\diagdown}}O-\overset{O}{\overset{\|}{C}}-(CH_2)_n-\overset{O}{\overset{\|}{C}}-O\underset{H_3C\;\;\;CH_3}{\overset{H_3C\;\;\;CH_3}{\diagdown\!\!\diagup}}N-R$$

| Mixture No. | R | n [% GC (gas chromatography)] | Analysis | calc. | found | melting point °C. |
|---|---|---|---|---|---|---|
| 101 | H | 2(25), 3(39), 4(27) | C % | 67.28 | 66.41 | 65–109 |
|  |  |  | H % | 10.31 | 10.12 |  |
|  |  |  | N % | 6.82 | 6.52 |  |
| 102 | Me | 2(26), 3(40), 4(24) | C % | 68.45 | 68.14 | — |
|  |  |  | H % | 10.57 | 11.33 |  |
|  |  |  | N % | 6.39 | 6.39 |  |
| 103 | H | 2(20), 3(52), 4(15) | C % | 67.28 | 65.62 | 47–74 |
|  |  |  | H % | 10.31 | 10.51 |  |
|  |  |  | N % | 6.82 | 6.37 |  |
| 104 | Me | 2(21), 3(55), 4(15) | C % | 68.45 | 66.55 | — |
|  |  |  | H % | 10.57 | 10.86 |  |
|  |  |  | N % | 6.39 | 6.86 |  |
| 105 | H | 3(79), 4(20) | C % | 66.95 | 67.1 | 67–77 |
|  |  |  | H % | 10.75 | 10.93 |  |
|  |  |  | N % | 6.79 | 6.61 |  |
| 106 | Me | 3(74), 4(23) | C % | 68.14 | 66.82 | — |
|  |  |  | H % | 10.98 | 11.00 |  |
|  |  |  | N % | 6.36 | 6.13 |  |
| 107 | H | 3(9), 4(85) | C % | 68.21 | 66.58 | 78–87 |
|  |  |  | H % | 10.02 | 10.74 |  |
|  |  |  | N % | 6.63 | 6.10 |  |
| 108 | Me | 3(9), 4(82) | C % | 68.18 | 68.02 | 78–87 |
|  |  |  | H % | 10.10 | 10.92 |  |
|  |  |  | N % | 6.24 | 5.85 |  |
| 109 | H | 7(47), 8(48) | C % | 69.73 | 69.48 | — |
|  |  |  | H % | 10.85 | 10.80 |  |
|  |  |  | N % | 5.91 | 5.26 |  |
| 110 | H | 4(42), 7(49) | C % | 68.72 | 68.63 | 75–80 |
|  |  |  | H % | 10.63 | 10.91 |  |
|  |  |  | N % | 6.29 | 6.07 |  |
| 111 | Me | 4(43), 7(42) | C % | 69.73 | 68.92 | — |
|  |  |  | H % | 10.85 | 10.84 |  |
|  |  |  | N % | 5.91 | 5.85 |  |
| 112 | H/Me (1:1) | 8(100) | C % | 70.40 | 70.20 | — |
|  |  |  | H % | 11.00 | 11.43 |  |
|  |  |  | N % | 5.66 | 5.63 |  |
| 113 | H/Me (3:1) | 2(20), 3(40), 4(20) | C % | 67.89 | 67.16 | — |
|  |  |  | H % | 10.44 | 10.55 |  |
|  |  |  | N % | 6.60 | 6.51 |  |
| 114 | Me | 3(70.3), 4(22.4) | C % | 68.14 | 68.10 | — |
|  |  |  | H % | 10.98 | 10.84 |  |
|  |  |  | N % | 6.36 | 6.29 |  |
| 115 | —O. | 2(20), 3(52), 4(15) |  |  |  | 41–42 |
| 116 | OC$_8$H$_{17}$ | 2(20), 3(52), 4(15) |  |  |  | — |

EXAMPLE 1

Preparation of the Mixture No. 101 a) 19.6 g (0.2 mol) concentrated sulfuric acid is added dropwise to a solution of 26.4 g (0.2 mol) "Dicarboxylic acid mixture" ex ®BASF in 200 ml methanol at room temperature. The reaction mixture is heated to reflux for 3 hours. The mixture is neutralized with 27.6 g (0.2 mol) potassium carbonate, poured into a saturated NH₄Cl solution and extracted with ethyl acetate. The organic extracts are dried (brine, Na₂SO₄) and concentrated in vacuo to give 32 g (100%) of the desired methyl ester mixture as a colorless liquid.

GC (gas chromatography)/MS (mass spectrum) analysis:

MW (molecular weight) 115 g/mol (28.3%), MW 129 g/mol (42.5%), MW 143 g/mol (29.2%).

b) A mixture of 26.7 g (0.15 mol) of the methyl diesters described in example 1a), 58 g (0.38 mol) 2,2,6,6-tetramethylpiperidin-4-ol and 1.5 g (6 mmol) dibutyltin oxide is heated to 150° C. while removing the methanol by distillation. After 2 hours a mild vacuum is applied (300 mbar) to the reaction mixture and stirring is continued another 10 hours at 150° C. The reaction mixture is cooled, diluted with hexane, filtered and concentrated in vacuum. The excess of piperidinol is removed by distillation (bulb tube: 170° C./0.08 mbar) to yield the title mixture as an amorphous white solid (melting range: 40°–65° C.).

EXAMPLE 2

Preparation of the Mixture No. 102

This mixture is prepared according to the procedure of Example 1, using 16 g (0.1 mol) of the diester-mixture described in Example 1a), 42.8 g (0.25 mol) of 1,2,2,6,6,-pentamethylpiperidin-4-ol and 1 g (4 mmol) of dibutyltin oxide. 34 g (78%) of the mixture no. 102 are obtained as a viscous oil.

EXAMPLE 3

Preparation of the Mixture No. 103

This mixture is prepared according to the procedure of Example 1, using 8 g (0.05 mol) of ®DBE (commercially available mixture of succinic, glutaric, and adipic acid methyl esters in the ratio of 20:59:21 ex ®Du Pont), 20.44 g (0.13 mol) of 2,2,6,6,-tetramethylpiperidin-4-ol and 0.62 g (2.5 mmol) of dibutyltin oxide. 16.5 g (81%) of the mixture no. 103 are obtained as an amorphous solid (melting range: 45°–74° C).

EXAMPLE 4

Preparation of the Mixture No. 104

This mixture is prepared according to the procedure of Example 1, using 8 g (0.05 mol) of ®DBE (commercially available mixture of succinic, glutaric, and adipic acid methyl esters in the ratio of 20:59:21 ex ®Du Pont), 19.7 g (0.115 mol) of 1,2,2,6,6,-pentamethylpiperidin-4-ol and 0.62 g (2.5 mmol) of dibutyltin oxide. 19.3 g (88%) of the mixture no. 104 are obtained as a viscous oil.

EXAMPLE 5

Preparation of the Mixture No. 105

A suspension of 11.4 g (0.07 mol) of ®DBE2 (commercially available mixture of glutaric and adipic acid methyl esters in the ratio of 77:23 ex ®Du Pont) and 26.4 g (0.17 mol) of 2,2,6,6,-tetramethylpiperidin-4-ol in 30 ml xylene is warmed to 80° C. Lithium amide (0.08 g, 3.5 mmol) is added to the resulting solution and the mixture is heated to 145° C. resulting in the distillation of methanol. The mixture is stirred for an additional 15 hours. After cooling to 80° C., acetic acid (0.3 g, 5 mmol) is added and the reaction mixture is diluted with hot toluene, filtered and concentrated in vacuum. After distillation of the excess of piperidinol (bulb tube: 180° C./0.1 mbar), 20 g (69%) of the mixture no. 105 are obtained as a white solid (melting range: 67°–77° C.).

EXAMPLE 6

Preparation of the Mixture No. 106

A mixture of 11.4 g (0.07 mol) of ®DBE2 ex ®Du Pont (see Example 5) and 26.4 g (0.15 mol) 1,2,2,6,6-pentamethylpiperidin-4-ol is dried by adding 10 ml of toluene and then heating under vacuum (200 mbar) at 140° C. to remove the water-toluene azeotrop. The vessel is pressurized with nitrogen and 0.7 g (3.5 mmol) of aluminium isopropoxide are added. The reaction mixture is heated to 160° C. resulting in the distillation of methanol. After 1 hour, a vacuum is applied (300 mbar), and the mixture is stirred for an additional 15 hours. After cooling to about 80° C., acetic acid (0.3 g, 5 mmol) is added and the reaction mixture is diluted with toluene, filtered and concentrated in vacuum. After distillation of the excess of piperidinol (bulb tube: 180° C./0.1 mbar), 26.3 g (85%) of the mixture no. 106 are obtained as an oil.

EXAMPLE 7

Preparation of the Mixture No. 107

This mixture is prepared according to the procedure of Example 1, using 12.1 g (0.07 mol) of ®DBE3 (commercially available mixture of glutaric and adipic acid methyl esters in the ratio of 10:90 ex ®Du Pont), 23.6 g (0.15 mol) of 2,2,6,6-tetramethylpiperidin-4-ol and 0.7 g of (2.8 mmol) of dibutyltin oxide. 20 g (68%) of the mixture no. 107 are obtained as an amorphous solid (melting range: 78°–87° C.).

EXAMPLE 8

Preparation of the Mixture No. 108

This mixture is prepared according to the procedure of Example 1, using 12.1 g (0.07 mol) of ®DBE3 (commercially available mixture of glutaric and adipic acid methyl esters in the ratio of 10:90 ex ®Du Pont), 26.4 g (0.15 mol) of 1,2,2,6,6-pentamethylpiperidin-4-ol and 0.7 g (2.8 mmol) of dibutyltin oxide. 28 g (89%) of the mixture no. 108 are obtained as an amorphous solid (melting range: 78°–87° C.).

EXAMPLE 9

Preparation of the Mixture No. 109

A suspension of 6.5 g (0.041 mol) of 2,2,6,6-tetramethylpiperidin-4-ol and 4.9 g (0.048 mol) of triethylamine in 150 ml of 1,2-dichloroethane is cooled to about 5° C. A mixture of 2.25 g (0.01 mol) of azelaic acid dichloride and of 2.39 g (0.01 mol) of sebacoyl chloride is added dropwise and the cooling bath is removed. The obtained thick white suspension is heated to 60° C. for 5 hours. After cooling to room temperature, the reaction mixture is filtered and concentrated in vacuum. The residue is dried under high vacuum (70° C./0.08 mbar) to give 9.32 g (98%) of the mixture no. 109 as a pale orange oil.

EXAMPLE 10

Preparation of the Mixture No. 110

This mixture is prepared according to the procedure of Example 5, using 22.65 g (0.144 mol) of 2,2,6,6- tetramethylpiperidin-4-ol, 5.23 g (0.03 mol) of methyl adipate, 6.49 g (0.03 mol) of methyl azelate and 0.07 g (3 mmol) of lithium amide. 20.5 g (77%) of the mixture no. 110 are obtained as a white solid (melting range: 75°–80° C.).

EXAMPLE 11

Preparation of the Mixture No. 111

This mixture is prepared according to the procedure of Example 1, using 25.65 g (0.15 mol) of 1,2,2,6,6-pentamethylpiperidin-4-ol, 5.23 g (0.03 mol) of methyl adipate, 6.49 g (0.03 mol) of methyl azelate and 0.75 g (3 mmol) of dibutyltin oxide. 25.9 g (91%) of the mixture no. 111 are obtained as an orange oil.

EXAMPLE 12

Preparation of the Mixture No. 112

This mixture is prepared according to the procedure of Example 1, using 10.22 g (0.065 mol) of 2,2,6,6-tetramethylpiperidin-4-ol, 11.13 g (0.065 mol) of 1,2,2,6,6-pentamethylpiperidin-4-ol, 11.52 g (0.05 mol) of methyl sebacate and 58 mg of "®Fascat 9201" (polymeric tin-based catalyst ex. ®Elf Atochem). 24.5 g (98%) of the mixture no. 112 are obtained as a brown oil.

EXAMPLE 13

Preparation of the Mixture No. 113

This mixture is prepared according to the procedure of Example 1, using 15.7 g (0.1 mol) of 2,2,6,6-tetramethylpiperidin-4-ol, 5.14 g (0.03 mol) of 1,2,2,6,6-pentamethylpiperidin-4-ol, 8 g (0.05 mol) of ®DBE ex ®Du Pont (see Example 3) and 58 mg "®Fascat 9201" (polymeric tin-based catalyst ex. ®Elf Atochem). 14 g (70%) of the mixture no. 113 are obtained as a brown oil.

EXAMPLE 14

Preparation of the Mixture No. 114

12 g (0.07 mol) 1,2,2,6,6-pentamethylpiperidin-4-ol are dried by heating under vacuum (100 mbar) at 140° C. during 1 hour 30 minutes (removal of water). After cooling to 100° C. the vessel is pressurized with nitrogen and 5.7 g (0.035 mol) of ®DBE2 (®Du Pont; see example 5) followed by 0.45 ml (1.75 mmol) of Aluminium-sec.-butylate are added. The reaction mixture is heated to 165° C. resulting in the distillation of methanol. After 30 minutes a vacuum is applied (200 mbar) and the mixture is stirred for an additional 5 hours. After cooling to about 80° C. formic acid (0.2 ml) is added, the reaction mixture is diluted with toluene, poured into water and extracted with toluene. The organic extracts are dried (brine, Na$_2$SO$_4$) and concentrated in vacuo to give 14.6 g of a pale yellow oil. The unreacted piperidinol is removed (bulb tube 150° C./0.1 mbar/2 h) to yield 13.5 g (88%) of the title mixture no. 114 as a light yellow oil.

EXAMPLE 15

Preparation of the Mixture No. 115

The transesterification of 49.8 g of the ®DBE (0.3116 mol) (®Du Pont; see example 3) with 111.6 g of 2,2,6,6-tetramethyl-4-hydroxypiperidine nitroxyl (0.6294 mol) and TPT catalysis (3.22 g, 0.011 mol) [TPT=tetraisopropyl titanate] in 350 g of n-heptane was completed within 7 hours with the pot temperature held at 97°–99° C. while the overhead temperature ranged between 64°–96° C. during MeOH removal. The batch was diluted with 30 g of n-heptane and the TPT catalyst treated with 20 g deionized H$_2$O at 90° C., and then azeotropic dried to 100° C. and filtered. The product solution was washed with 5×100 g MeOH:H$_2$O (10%) at 70° C. to remove excess of 2,2,6,6-tetramethyl-4-hydroxypiperidine nitroxyl, and then azeotropically dried to 100° C. The batch was slowly cooled to the crystallization point, 41°–42° C., and further cooled to 10° C. The batch was filtered and rinsed with cold n-heptane and then dried to give a red solid, 124.3 g (90.7% isolated yield).

EXAMPLE 16

Preparation of the Mixture No. 116

Conversion of the ®DBE dinitroxyl (no. 115, example 15) to the respective NO-octyl derivative was effected by reacting 51 g of dinitroxyl (0.1159 mol), 0.13 g of MoO$_3$ (0.0009 mol), 228 g of n-octane (1.996 mol) with 36.5 g×70% t-butylhydroperoxide (0.4050 mol) that was added over 1.75 hours at 95°–110° C. The reaction temperature was allowed to increase to 118° C. by the removal of H$_2$O/t-butanol/n-octane distillate utilizing a 5 stage Oldershaw column, and held for a total of 13 hours. The reaction mass was cooled to 55° C. and the MoO$_3$ removed via filtration. Isolation required 27.8 g of 11% sodium sulfite treatment in combination with 2.5 g of 20% NaOH at 55° C. for 1 hour. The aqueous layer was then removed and the organic layer was neutralized by the addition of 20 g deionized H$_2$O and acetic acid. ®Darco KB44 (5 g) (™ of ICI, activated carbon) was then charged and the solution heated to 70° C. and held for 1 hour. Following filtration and strip at 70° C. under full vacuum, a light yellow oil was obtained with % transmission at 425 nm, 450 nm and 500 nm being 98.3%, 98.7% and 99.3%, respectively.

EXAMPLE 17

Stabilization of a 2-Coat Metallic Finish

The light-stabilizers to be tested are dissolved in 30 g of Solvesso® 100 and tested in a clearcoat having the following composition:

| | |
|---|---|
| Synthacryl ® SC 303[1] | 27.51 g |
| Synthacryl ® SC 370[2] | 23.34 g |
| Maprenal ® 650[3] | 27.29 g |
| Butyl acetate/Butanol (37/8) | 4.33 g |
| Isobutanol | 4.87 g |
| Solvesso ® 150[4] | 2.72 g |
| Crystal Oil K-30[5] | 8.74 g |
| Levelling assistant Baysilon ® MA[6] | 1.20 g |
| | 100.00 g |

[1]Acrylate resin, ® Hoechst AG; 65% solution in xylene/butanol (26:9)
[2]Acrylate resin, ® Hoechst AG; 75% solution in Solvesso ® 100[4]
[3]Melamine resin, ® Hoechst AG; 55% solution in isobutanol
[4]aromatic hydrocarbon mixture, boiling range: 182–203° C. (Solvesso ® 150) or 161–178° C. (Solvesso ® 100); manufacturer: ® Esso
[5]aliphatic hydrocarbon mixture, boiling range: 145–200° C.; manufacturer: ® Shell
[6]1% in Solvesso ® 150; manufacturer: ® Bayer AG 1% of the light-stabilizers to be tested is added to the clearcoat, based on the solids content of the varnish. Some further varnish samples are prepared which, in addition to the novel compounds, contain 1.5% of the compound of the formula:

$$\text{[Structure: benzotriazole with HO, C(CH}_3\text{)}_3\text{, and CH}_2\text{-CH}_2\text{-CO}_2\text{-C}_8\text{H}_{17}\text{ substituents]}$$

For comparison, a clearcoat containing no light-stabilizers is used.

The clearcoat is diluted with Solvesso® 100 to spray viscosity and is applied by spraying to a prepared aluminium panel (®Uniprime Epoxy, silver-metallic basecoat) which is baked at 130° C., for 30 minutes, to give a dry film thickness of 40–50 μm of clearcoat.

The samples are then weathered in an Atlas ®UVCON weathering unit (UVB-313 lamps) in a cycle comprising UV irradiation at 70° C. for 8 hours and condensation at 50° C. for 4 hours.

The surface gloss (20° gloss as defined in DIN 67530) of the samples is then measured at regular intervals. The results are shown in Tables 2a–2d.

TABLE 2a

| Light-stabilizer | 20° * gloss as defined in DIN 67530 after 0, 1600 and 2000 hours weathering in the ® UVCON (UVB-313) | | |
|---|---|---|---|
| | 0 hours | 1600 hours | 2000 hours |
| None | 87 | ** | |
| (A) | 87 | 28 | 13 |
| (B) | 86 | 24 | *** |
| (C) | 86 | 49 | 21 |

*: high values indicate a good stabilization
**: shrinking after 800 hours
***: shrinking after 1600 hours
Light-stabilizers used:

$$\text{[Structure: bis-piperidinyl diester: R-N(piperidine, 2,2,6,6-tetramethyl)-O-C(=O)-(CH}_2\text{)}_n\text{-C(=O)-O-(piperidine)-N-R]}$$

Light-stabilizer (A): R = —CH$_3$; n = 4
Light-stabilizer (B): R = —CH$_3$; n = 7
Light-stabilizer (C):
Mixture no. 111 (R = —CH$_3$; ratio of n = 4 (43%)/7 (42%))

TABLE 2b

| Light-stabilizer | 20° * gloss as defined in DIN 67530 after 0 and 1600 hours weathering in the ® UVCON (UVB-313) | |
|---|---|---|
| | 0 hours | 1600 hours |
| None | 87 | ** |
| (D) | 87 | 53 |
| (E) | 87 | 28 |
| (F) | 87 | 61 |

*: high values indicate a good stabilization
**: shrinking after 800 h

TABLE 2b-continued

Light-stabilizers used:

$$\text{[Structure: bis-piperidinyl diester as above]}$$

Light-stabilizer (D): R = —CH$_3$; n = 3
Light-stabilizer (E): R = —CH$_3$; n = 4
Light-stabilizer (F):
Mixture no. 108 (R = —CH$_3$; ratio of n = 3 (9%)/4 (82%))

TABLE 2c

| Light-stabilizer | 20° * gloss as defined in DIN 67530 after 0, 4000 and 4400 hours weathering in the ® UVCON (UVB-313) | | |
|---|---|---|---|
| | 0 hours | 4000 hours | 4400 hours |
| None | 87 | ** | |
| ® TINUVIN 384 | 86 | *** | |
| (A) + ® TINUVIN 384 | 87 | 85 | 41 |
| (B) + ® TINUVIN 384 | 87 | 75 | 25 |
| (C) + ® TINUVIN 384 | 87 | 87 | 63 |

*: high values indicate a good stabilization
**: cracking after 1200 hours
***: cracking after 2000 hours
Light-stabilizers used:

® TINUVIN 384

$$\text{[Structure: benzotriazole with HO, C(CH}_3\text{)}_3\text{, and CH}_2\text{-CH}_2\text{-CO}_2\text{-C}_8\text{H}_{17}\text{ substituents]}$$

$$\text{[Structure: bis-piperidinyl diester as above]}$$

Light-stabilizer (A): R = —CH$_3$; n = 4
Light-stabilizer (B): R = —CH$_3$; n = 7
Light-stabilizer (C):
Mixture no. 111 (R = —CH$_3$; ratio of n = 4 (43%)/7 (42%))

TABLE 2d

| Light-stabilizer | 20° * gloss as defined in DIN 67530 after 0, 4000, 4400 and 4800 hours weathering in the ® UVCON (UVB-313) | | | |
|---|---|---|---|---|
| | 0 hours | 4000 hours | 4400 hours | 4800 hours |
| None | 87 | ** | | |
| ® TINUVIN 384 | 86 | *** | | |
| (G) + ® TINUVIN 384 | 87 | 75 | 25 | **** |
| (H) + ® TINUVIN 384 | 86 | 48 | 24 | **** |

TABLE 2d-continued

| | | | | |
|---|---|---|---|---|
| ®TINUVIN 384 (I) + ®TINUVIN 384 | 87 | 88 | 64 | 33 |

*: high values indicate a good stabilization
**: cracking after 1200 hours
***: cracking after 2000 hours
****: cracking after 4400 hours Light-stabilizers used:

®TINUVIN 384

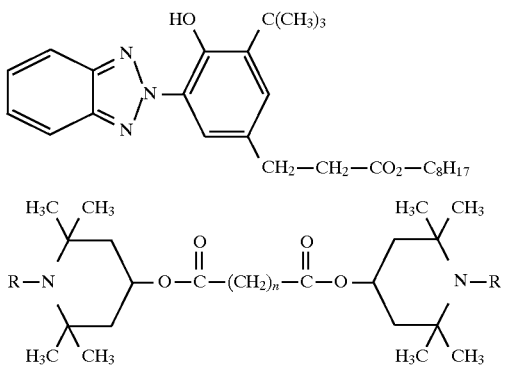

Light-stabilizer (G): R = —CH$_3$; n = 7
Light-stabilizer (H): R = —CH$_3$; n = 8
Light-stabilizer (I):
Mixture no. 109 (R = —CH$_3$; ratio of n = 7 (47%)/8 (48%))

The results listed in Tables 2a, 2b, 2c and 2d show that the samples stabilized with a stabilizer mixture according to the invention have better weathering stability (gloss retention) than the unstabilized sample or the sample stabilized with the single components of the stabilizer mixture.

EXAMPLE 18

Stabilization of Polypropylene Plaques 1 g of each of the compounds indicated in Table 3, 1 g if tris(2,4-di-tert-butylphenyl)phosphite, 0.5 g of pentaerythritoltetrakis[3-(3,5-di-tert-butyl-4-hydroxyphenyl)proprionate], 1 g of calcium stearate and 1 g of ®Filofin Blue G (ex ®Ciba-Geigy) are mixed in a turbo mixer with 1000 g of polypropylen powder of melt index=4 g/10 minutes (measured at 230° C. and 2.16 kg). The mixtures obtained are extruded at a temperature of 200°–230° C. to give polymer granules which are then convened into plaques of 2 mm thickness by injection moulding at 200°–220° C. The plaques obtained are exposed in a model 65 Wr Weather-O-Meter (ASTM D2565–85) with a black panel temperature of 63° C. until surface embrittlement (chalking) starts. A plaque of poylpropylene prepared under the same conditions as indicated above but without the addition of the compounds of the invention is exposed for comparison. In Table 3, the exposure time needed to reach this start of embrittlement is given in hours. The longer the time the better is the stabilizing effect.

TABLE 3

| Light-stabilizer | Chalking time (hours) |
|---|---|
| None | 570 |
| (J) | 4460 |
| (K) | 4050 |

TABLE 3-continued

| | |
|---|---|
| (L) | 5020 |

Light-stabilizers used:

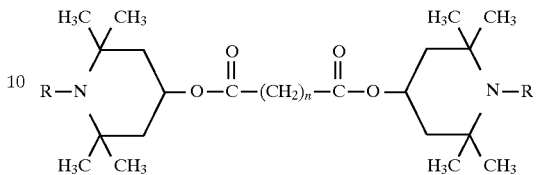

Light-stabilizer (J): R = H; n = 3
Light-stabilizer (K): R = H; n = 4
Light-stabilizer (L):
Mixture no. 105 (R = H: ratio of n = 3 (79%)/4 (20%))

The results listed in Table 3 show that the sample stabilized with a stabilizer mixture according to the invention has a better chalking stability than the unstabilized sample or the samples stabilized with the single components of the stabilizer mixture.

I claim:

1. A stabilizer mixture containing two different compounds of the formula (I)

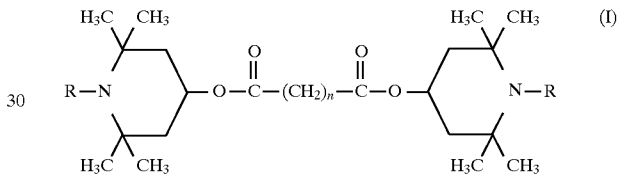

wherein n is an integer from 2 to 22 and R is hydrogen, $C_1$–$C_8$alkyl, —O·, —OH, —NO, —CH$_2$CN, $C_1$–$C_{18}$alkoxy, $C_5$–$C_{12}$cycloalkoxy, $C_3$–$C_6$alkenyl, $C_3$–$C_6$alkynyl, $C_1$–$C_8$acyl or $C_7$–$C_9$phenylalkyl unsubstituted or substituted on the phenyl by 1, 2 or 3 $C_1$–$C_4$alkyl; the weight ratio of the two compounds being 1:20 to 20:1.

2. A stabilizer mixture according to claim 1 wherein n is an integer from 2 to 10.

3. A stabilizer mixture according to claim 1 wherein the two compounds of the formula (I) differ only in the variable n.

4. A stabilizer mixture according to claim 1 wherein the two compounds of the formula (I) differ in the variable n and the difference between the two values of n is 1, 2, 3, 4 or 5.

5. A stabilizer mixture according to claim 1 wherein the variable n of one compound of the formula (I) is 3 and the variable n of the other compound of the formula (I) is 4.

6. A stabilizer mixture according to claim 1 wherein the variable n of one compound of the formula (I) is 4 and the variable n of the other compound of the formula (I) is 7.

7. A stabilizer mixture according to claim 1 wherein the variable n of one compound of the formula (I) is 7 and the variable n of the other compound of the formula (I) is 8.

8. A stabilizer mixture according to claim 1, containing additionally a third compound of the formula (I).

9. A stabilizer mixture according to claim 1 wherein the variable n of one compound of the formula (I) is 2 and the variable n of the other compound of the formula (I) is 3; said mixture containing additionally a third compound of the formula (I) with n being 4.

10. A stabilizer mixture according to claim 1 wherein the two compounds of the formula (I) differ only in the meaning of the radical R.

11. A stabilizer mixture according to claim 1 wherein R is hydrogen, $C_1$–$C_4$alkyl, —OH, $C_1$–$C_8$alkoxy, $C_5$–$C_8$cycloalkoxy, allyl, benzyl, acetyl or acryloyl.

12. A stabilizer mixture according to claim 1 wherein R is hydrogen or methyl.

13. A stabilizer mixture according to claim 1, containing as additional component an UV absorber based on hydroxyphenylbenzotriazoles and/or hydroxybenzophenones and/or oxalic anilides and/or hydroxyphenyl-s-triazines.

14. A composition containing an organic material subject to oxidative, thermal or light-induced degradation and a stabilizer mixture according to claim 1.

15. A composition according to claim 14 wherein the organic material is a synthetic polymer.

16. A composition according to claim 14 wherein the organic material is a thermoplastic polymer or a binder for coatings.

17. A composition according to claim 14 wherein the organic material is a polyolefin.

* * * * *